US009860327B2

(12) United States Patent
Bhogal et al.

(10) Patent No.: US 9,860,327 B2
(45) Date of Patent: Jan. 2, 2018

(54) WEB-BROWSING RECOMMENDATIONS BASED ON AGGREGATED PATH DATA

(71) Applicant: International Business Machines Corporation, Armonk, NY (US)

(72) Inventors: Kulvir S. Bhogal, Fort Worth, TX (US); Gregory J. Boss, Saginaw, MI (US); Sheryl L. Comes, Castle Pines, CO (US); Rick A. Hamilton, II, Charlottesville, VA (US); Anne R. Sand, Franktown, CO (US)

( * ) Notice: Subject to any disclaimer, the term of this patent is extended or adjusted under 35 U.S.C. 154(b) by 373 days.

(21) Appl. No.: 14/644,513

(22) Filed: Mar. 11, 2015

(65) Prior Publication Data

US 2016/0269473 A1    Sep. 15, 2016

(51) Int. Cl.
  *G06F 15/16*    (2006.01)
  *H04L 29/08*    (2006.01)

(52) U.S. Cl.
  CPC .................................. *H04L 67/22* (2013.01)

(58) Field of Classification Search
  CPC ...................................................... H04L 67/22
  USPC ....................................................... 709/204
  See application file for complete search history.

(56) References Cited

U.S. PATENT DOCUMENTS

| 8,321,793 | B1 | 11/2012 | Cotter et al. |
| 8,326,986 | B2 | 12/2012 | Papadimitriou et al. |
| 8,429,750 | B2 | 4/2013 | Bennett |
| 2003/0014399 | A1 | 1/2003 | Hansen et al. |
| 2008/0134042 | A1* | 6/2008 | Jankovich ................. G06F 8/00 715/733 |
| 2013/0239212 | A1 | 9/2013 | Bennett |

OTHER PUBLICATIONS

"Google Panda", Wikipedia, the free encyclopedia, last modified on Dec. 21, 2014, <http://en.wikipedia.org/wiki/Google_Panda>.
"Music Genome Project", Wikipedia, the free encyclopedia, last modified on Dec. 4, 2014, <http://en.wikipedia.org/wiki/Music_Genome_Project>.
"Scraper site", Wikipedia, the free encyclopedia, last modified on Jul. 28, 2014, <http://en.wikipedia.org/wiki/Scraper_site>.

(Continued)

*Primary Examiner* — Hee Soo Kim
(74) *Attorney, Agent, or Firm* — Daniel R. Simek

(57) ABSTRACT

A method for generating website recommendations based on user web browsing. The method includes a computer processor tracking a sequence of two or more websites traversed by a user, wherein the sequence is based, at least in part, on a web-browsing session of the user. The method further includes a computer processor identifying a plurality of sequences of websites traversed by other users, wherein the plurality of sequences of web sites traversed by other users include at least one website in common with the tracked sequence of two or more websites traversed by the user. The method further includes a computer processor determining one or more recommended websites in the plurality of sequences of websites traversed by other users that are relevant to the tracked sequence of two or more websites traversed by the user. The method further includes a computer processor presenting the one or more recommended websites to the user.

11 Claims, 6 Drawing Sheets

(56) References Cited

OTHER PUBLICATIONS

Google Page Rank & Algorithm Updates, Search Engine, Roundtable, Copyright 1994-2015, RustyBrick, Inc., <http://www.seroundtable.com/category/google-updates>, printed Feb. 24, 2015.

* cited by examiner

WEB-BROWSING RECOMMENDATIONS BASED ON AGGREGATED PATH DATA

BACKGROUND OF THE INVENTION

The present invention relates generally to the field of Internet navigation, and more particularly to developing recommendations for Internet browsing.

Initially, searches for information and locating entities (e.g., businesses, locations, individuals) in the World Wide Web (e.g., the Web, the Internet) were focused on finding the relevant result for any given user request. This approach drives a majority of the web searches yielding results based on codified or explicit knowledge.

Alternatively, some on-line services provide information and search recommendations to a user based on various models to classify and present the webpages or URLs (uniform resource locators). For example, recommendations and search results are based on user-generated tags, areas of interest, aggregated stories, "likes" (e.g., voting), and content curation by paid staff. These on-line services execute searches based on less rigorous criteria providing a user with different results. These methods provide a user additional choices which may yield a more intellectually stimulating web-browsing experience through the unexpected discovery of relevant information on an item.

SUMMARY

According to an aspect of the present invention, there is a method, computer program product, and/or system for generating website recommendations based on user web browsing. The method includes one or more computer processors tracking a sequence of two or more websites traversed by a user, wherein the sequence is based, at least in part, on a web-browsing session of the user. The method further includes one or more computer processors identifying a plurality of sequences of websites traversed by other users, wherein the plurality of sequences of websites traversed by other users include at least one website in common with the tracked sequence of two or more websites traversed by the user. The method further includes one or more computer processors determining one or more recommended websites in the plurality of sequences of websites traversed by other users that are relevant to the tracked sequence of two or more websites traversed by the user. The method further includes one or more computer processors presenting the one or more recommended websites to the user.

DETAILED DESCRIPTION

Figure 1:
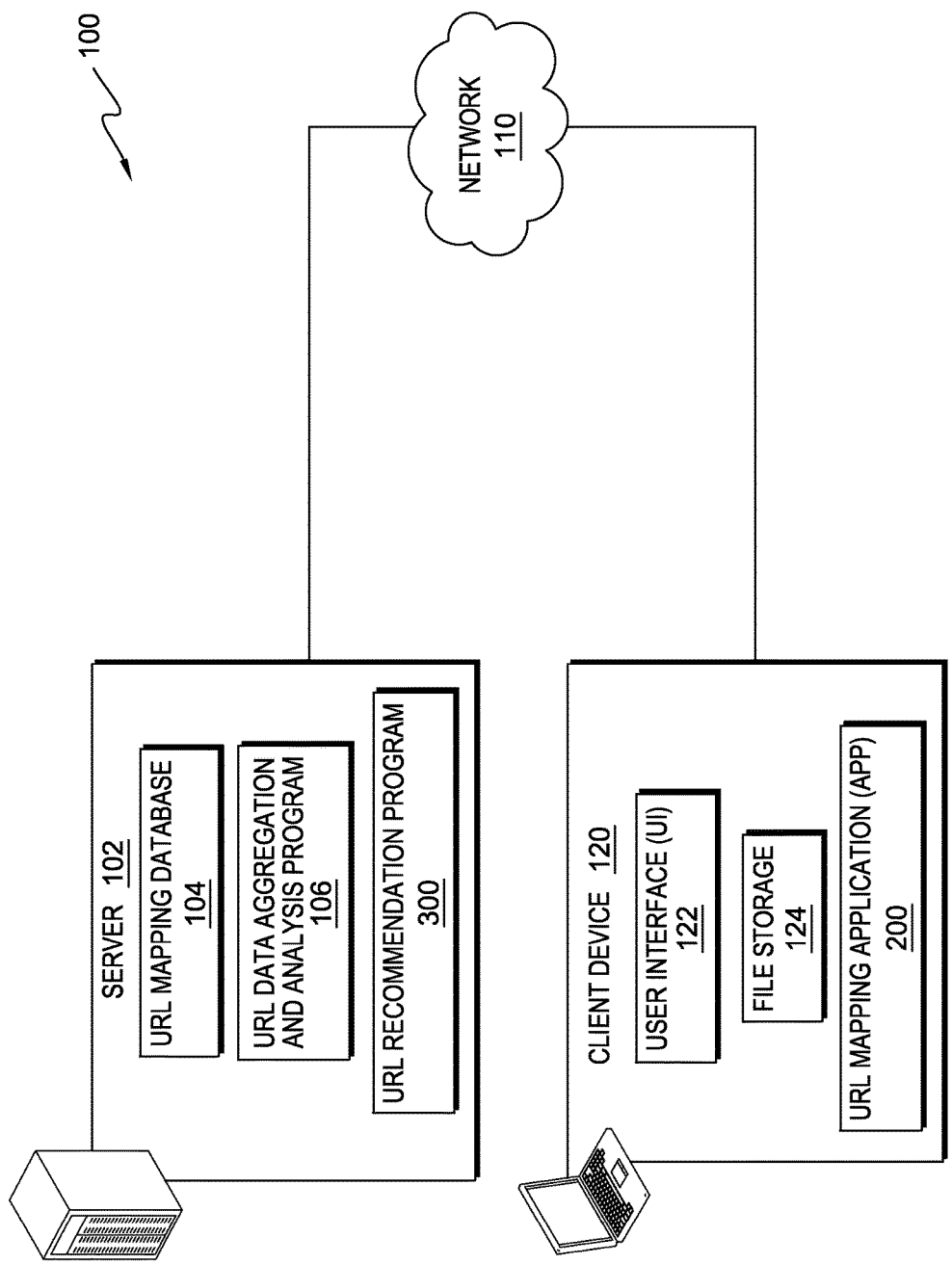
FIG. 1 illustrates a distributed data processing environment, in accordance with an embodiment of the present invention.

Embodiments of the present invention recognize that web browsing and Internet searches rely on codified and implicit knowledge. On-line services, social networking, and special interest websites provide alternative algorithms and ranking systems that supply the search engine functions to provide a user access and direction to myriads of information available on the Internet. However, some websites (e.g., adaptive websites) contain dynamic content that an owner of the website or an advertiser on the website automatically modifies to tailor the website to a specific demographic or individual. Dynamic content may be useful to some users; however, the incorporation of dynamic content may change the behavior of a website eliminating links that some users may prefer to explore. This elimination of information may lead to a relevance paradox for a user.

In one scenario, a relevance paradox may be described as a situation where a user gathers information relevant to making a decision; however, some information is excluded by someone or something else that deemed the information as unnecessary or distracting (e.g., classified as irrelevant) to a search. However, the excluded information may actually be crucial to making the optimal decision. In another scenario, the relevance paradox occurs when a user requires information, but the user does not know precisely where to start a search. If a user does not know precisely what information is lacking, the user does not know what questions or search terms to input to initialize the search for the information. Presented with constrained results, a user may not be supplied a series of links (e.g., uniform resource locators (URLs)) that eventually accesses the required information. In addition, embodiments of the present invention recognize that another situation that restricts access to information is a "filter bubble." As search engines and websites become familiar with the web-browsing behavior of a user, personalized search algorithms that provide results increase the weighting of some factors and diminish the effect of other factors, thereby reducing the visibility (e.g., filtering) of some results or eliminating other results. In some cases, overly personalized search algorithms may intellectually isolate a user within their own informational bubble.

Embodiments of the present invention also recognize that adaptive websites affect the ability of two users to access the same information even if both users access a common website (e.g., URL) during a web-browsing session. Additionally, the communication of search methodologies may be difficult to transfer between users. Embodiments of the present invention recognize that different individuals may access the same websites or information, herein denoted as URLs, via multiple paths. Useful information and serendipitous discoveries may be found on URLs leading (e.g., converging) to a common URL (e.g., nexus URL) or proceeding (e.g., diverging) from the common URL. In some scenarios, more than one URL may be designated as common URLs. For example, the browsing sequences of interest to a user may be the web-browsing sequences of other users that form a "wandering" path that is significantly longer than that of the user but intersect at multiple URLs. Some embodiments of the present invention enable a user to define URL browsing sequences of varying length, as opposed to specifying one or more common URLs (e.g., nexus URLs), to be designated as a "common path" as the basis for discovering the URL browsing patterns (e.g., URL traversal paths) of other users. Other embodiments of the present invention permit the user to combine preferences. For example, a user may specify one common URL and designate that the sequences of interest are comprised of the specified common URL and sequence segments three URLs long.

Embodiments of the present invention also recognize that aggregating the traversal information (e.g., traversed URL paths) of multiple users and tracking the interest level of multiple users provides data for mapping the URLs visited by multiple individuals. Additionally, the tracked interest levels of the mapped URLs provides a user options for the customization of sorting or of filtering the mapped URL's. Embodiments of the present invention presume that most users may prefer to have their web-browsing activities be anonymous. However, some individuals (e.g., power-users, academics, notable individuals, etc.) may wish to be known to other users or to be known by a generic profile (e.g., a profession, a lifestyle, an interest, a location, etc.). Some embodiments of the present invention permit a user to create multiple profiles to facilitate discovering URLs related to specific interests. Other embodiments of the present invention incorporate aspects of social networking where a user may elect to "follow" another user or a group of users (e.g., club, organization, fans of a genre, etc.). In one scenario, "following" another user or group of users may affect the generation of a mapped URL matrix associated with the web-browsing activity of a user. In another scenario, "following" another user or group of users may permit a user to access one or more mapped URL matrices associated with the other user or group of users independent of the web-browsing behavior of the user. For example, a user may supply one or more preferences or filters to constrain the scope or number of mapped URL matrices generated by another user or group of users that are "followed."

Some embodiments of the present invention facilitate presentation of the mapped URLs to a user. Different presentation methods may provide a user with alternative filtering and sorting schemes. In various embodiments, some or all of the URLs associated with a web-browsing session of a user are included as part of a mapped URL matrix. For example, some filtering schemes may apply user preferences (e.g., subject blocks) to disallow the mapping of certain types of URLs. In a different example, a user preference may dictate a threshold (e.g., popularity, browsing duration, time span of interest, etc.) as at least part of a sorting scheme or filtering scheme. Other user preferences dictate how much of a mapped URL matrix is presented or displayed to a user. For example, a user may specify a degree of separation that is the displayed relative to one or more common URLs. One degree of separation is defined as the URLs that are directly linked to a URL in common with a URL within the browsing sequence of a user. Two degrees of separation is defined as the URLs that have one intermediate URL link between them, and a URL in common with a URL within the browsing sequence of a user.

In another example, a user preference may indicate which URL path directions are of interest to a user (e.g., diverging, converging, bidirectional). In one embodiment, a mapped URL matrix may be presented as a simple list of URLs as hypertext links with options to view a hierarchy of URLs leading to a URL that is of interest to a user and a hierarchy of URLs branching away from the URL of interest. In another embodiment, mapped URLs are presented visually.

In one scenario, the mapped URLs may be presented as a two-dimensional map. In one instance, the width of a line (e.g., link) connecting two URLs is associated with a relative number of users that traverse the URL link, the color of the URL link is associated with the relevance of the linked URL to the profile or filters set by the user, and the brightness of the line is associated with the interest level of the aggregated users with the subsequent URL. In another instance, a user may choose to have numeric values associated with URL links. In yet another instance, a subset of links, one degree of separation removed from the common URL, may be depicted as a donut graph where the size of the segment is associated with the number of users accessing those links. In another scenario, the links and associated URLs may be depicted in three dimensions. For example, a mapped URL matrix may be depicted as a star-field map where the distance from the common URL (e.g., nexus URL) to a next URL (e.g., star at one degree of separation) is associated with the relevance to the user.

In another example, the closer to the common URL the more relevant the next URL is to a user based on the filtering or the sorting set by a user. The URLs depicted above the position of a user are divergent links (e.g., URLs after the nexus URL), and the URLs depicted below the position of a user are convergent links (e.g., URLs leading to the nexus URL). URLs that are two degrees of separation from the common URL may be depicted as planets around a URL "star." URLs that are three degrees of separation from the common URL may be depicted as "moons" around a URL "planet." Other embodiments may incorporate functionality to handle and depict manually entered URLs (e.g., unlinked sequences), dangling links, flagged links (e.g., suspicious sites, sites containing malware, etc.), broken links, dead-end links, web-browsing patterns that backtrack, and web-browsing patterns that are cyclical.

Different embodiments of the present invention may be adapted to function within a distributed computing environment that forms an intranet (e.g., internal government websites, internal company websites, etc.). Another different embodiment of the present invention may function in a hybrid mode across multiple types of distributed computing environments. For example, employee browsing is permitted in both the Internet (i.e., the Web) and the intranet of the company that employs the employee. Only the URLs traversed outside of the intranet of the company are used to define the browsing sequence associated with a user and the intranet browsing information for determining recommended URLs or mapped URL matrices. In addition, the intranet activity of the user is not accessible to embodiments of the present invention executing on the Internet.

The descriptions of the various scenarios, instances, and examples related to the present invention have been presented for purposes of illustration but are not intended to be exhaustive or limited to the embodiments disclosed. Embodiments of the present invention do not require a user (e.g., the traversing entity, the browsing entity) to be human. For example, a user or browsing entity may be another computer, an avatar for a human user (e.g., a personal digital assistant), a computer program, an electronic device (e.g., part of the Internet-of-Things), or an analytic engine. Embodiments of the present invention are not restricted to information or URLs accesses by Hypertext Transfer Protocol (HTTP).

The present invention will now be described in detail with reference to the Figures. FIG. 1 is a functional block diagram illustrating distributed data processing environment 100 in an embodiment, in accordance with the present invention.

An embodiment of distributed data processing environment 100 includes server 102 and client device 120 interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as client device 120 via network 110. Server 102 may include components, as depicted and described in further detail with respect to FIG. 5, in accordance with embodiments of the present invention.

Server 102 includes URL mapping database 104, URL data aggregation and analysis program 106, URL recommendation program 300, and various programs (not shown). In an embodiment, server 102 contains a database of users and functions to anonymize user information as dictated by privacy policies and user preferences. In some embodiments, user web-browsing data aggregation and user information anonymization is provided by a proxy service accessed by server 102 via network 110. In other embodiments, user web-browsing data aggregation and user information anonymization is provided by a cloud-based service accessed by server 102 via network 110.

URL mapping database 104 contains the URL browsing (e.g., web browsing) sequences of a plurality of users. In one embodiment, the data within URL mapping database 104 is, by and large, anonymized. In one scenario, the URL sequences of users contributing (e.g., participating) web browsing for aggregation is stored in URL mapping database 104. In another scenario, the URL browsing sequences of some users are uniquely identified or segregated. In one instance, the URL browsing sequences of a user demonstrating a low-participation (e.g., infrequent) rate are flagged and not incorporated within subsequent URL mapping analyses. In another instance, the flagged status of a user demonstrating a low-participation rate is adjusted once a threshold number of sequences is associated with the user. In another embodiment, the data within URL mapping database 104 is partially anonymized. In one scenario, information within URL mapping database 104 may contain generic user profile or demographic data. For example, a user may allow general demographic data, such as a profession (e.g., doctor, engineer, paid athlete, homemaker, etc.), education level (e.g., PhD, B.S., high school, middle school, etc.), gender, and ethnicity.

In another example, a generic user profile may include such information as interests (e.g., gardening, sports, travel, music, etc.), location (e.g., country, state), and groups (civic organizations, political organizations, social organization, professional organizations, etc.). In a further embodiment, some users may elect less anonymity or no anonymity (e.g., to be "known") to permit their web-browsing activities to be "followed," as is the case in some social networking settings. In some scenarios, a "known" user that permits other users to follow the URL browsing activity of the known user may have the capability to choose which web-browsing sessions are public knowledge and which web-browsing sessions are anonymized. Similarly, a "followed" user or group may permit some mapped URL matrices generated by the "followed" user or group to be accessed by other users.

URL data aggregation and analysis program 106 interacts with URL mapping database 104 and URL recommendation program 300. In one embodiment, URL data aggregation and analysis program 106 anonymizes, sorts, and filters user web-browsing information and URL sequences provided by a user of client device 120 via network 110 and URL recommendation program 300. URL data aggregation and analysis program 106 stores the user web-browsing information and URL sequences in URL mapping database 104 on server 102. In another embodiment, URL data aggregation and analysis program 106 produces queries to access information within URL mapping database 104 based, at least in part, on web-browsing session data, user filters and preferences, and other user input via UI 122 executing on client device 120, or URL mapping application (app) 200 executing on client device 120. In some scenarios, user filters and preferences are stored in file storage 124 on client device 120. In a different embodiment, URL data aggregation and analysis program 106 produces queries to access information within another version of URL mapping database 104 located on another computing device, a remote server, or the cloud accessible by server 102 via network 110.

URL recommendation program 300 interacts with URL data aggregation and analysis program 106 and other programs (not shown) generating one or more mapped URL matrices. A mapped URL matrix generated by URL recommendation program 300 describes or depicts URLs that are selected from an aggregation of URLs (e.g., URL mapping database 104) visited by other users that are linked to one or more URLs of interest to a user of client device 120. In one embodiment, URL recommendation program 300 is programmed to generate the one or more mapped URL matrices based on the data provided by URL data aggregation and analysis program 106 and the determined user filters and preferences provided by URL mapping app 200. In another embodiment, URL recommendation program 300 communicates with a user via URL mapping app 200 to obtain user filters and preferences "on-the-fly." In some embodiments, URL recommendation program 300 communicates with other programs (e.g., drawing programs, graphic programs, animation programs, virtualization programs, etc.) to generate the one or more mapped URL matrices based on the data provided by URL data aggregation and analysis program 106 and the determined user filters and preferences provided by URL mapping app 200.

In a different embodiment, URL recommendation program 300 determines that a user indicates, via URL mapping app 200 or UI 122, that the user is interested in storing one or more mapped URL matrices for subsequent browsing activity. For example, a user stopped browsing to shut down client device 120; however, the user did not complete an investigation of a mapped URL matrix and wants to continue exploring the mapped URL matrix at some point in the future. In one scenario, URL recommendation program 300 stores the indicated one or more mapped URL matrices in file storage 124 on client device 120. In another scenario, URL recommendation program 300 stores the indicated one or more mapped URL matrices on server 102 in URL mapping database 104 or another persistent storage location (not shown).

In one embodiment, client device 120 and server 102 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between client device 120 and server 102, in accordance with embodiments of the present invention. In another embodiment, network 110 operates locally via wired, wireless, or optical connections and can be any combination of connections and protocols (e.g., NFC, laser, infrared, etc.).

Client device 120 may be a personal computer (PC), a smart phone, a tablet computer, a netbook computer, a personal digital assistant (PDA), a wearable device (e.g., digital eyeglasses, smart glasses, smart watches), a laptop computer, or any programmable computer system operating utilizing wired or wireless network communications (e.g., WAN, laser, infra-red, etc.) known in the art. In general, client device 120 is representative of any programmable electronic device or combination of programmable electronic devices capable of executing machine readable program instructions and communicating with computers, such as server 102 via network 110. Client device 120 may include components, as depicted and described in further detail with respect to FIG. 5, in accordance with embodiments of the present invention.

Client device 120 includes user interface (UI) 122, file storage 124, URL mapping application (app) 200, and a web browser (not shown). A user of client device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., URL mapping app 200, a web browser, a widget, etc.) can generate UI 122, operating within the GUI of client device 120. UI 122 accepts input from a plurality of input/output (I/O) devices (not shown) including, but not limited to, a tactile sensor interface (e.g., a touch screen, a touchpad) or a natural user interface (e.g., voice control unit, motion capture device, cyberglove, etc.). In addition to the audio and visual interactions that client device 120 may provide, a peripheral, such as a cyberglove, may provide haptic feedback to a user. An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

URL mapping application (app) 200 monitors the web-browsing activity of a user and communicates information related to the web-browsing activity of a user with URL recommendation program 300. In one embodiment, URL mapping app 200 is associated with one or more web browsers and executes in the background without user intervention. In another embodiment, a user may "opt out" and deactivate the automatic execution of URL mapping app 200. URL mapping app 200 may subsequently be activated by the user. For example, URL mapping app 200 may have an icon on a tool bar on a web browser or a widget on the desktop of client device 120. In some embodiments, an instance of URL mapping app 200 activates for each unrelated web browser (e.g., web browsers of different software developers) or each unrelated web-browsing session. For example, a user may have three independent web-browsing sessions active (e.g., different tabs, multiple web browsers active), a browsing session monitors news feeds, a browsing session is associated with gardening, and a browsing session is employed by the user for e-mail activity. In this example, the user may "opt out" of URL mapping app 200 monitoring URLs related to the e-mail session. In other embodiments, URL mapping app 200 bases the generation of mapped URL matrices and the presentation of mapped URL matrices on user filters and user preferences. In one embodiment, user filters and user preferences are preset. In another embodiment, URL mapping app 200 dynamically generates filters and provides input area that a user employs, via UI 122, select mapped URL matrices and modify the presentation of the mapped URL matrices. In some embodiments, URL recommendation program 300, URL data aggregation and analysis program 106, and URL mapping database 104 provide additional information to URL mapping app 200 that may generate: additional filters, additional preference choices, and additional presentation options.

Figure 2:
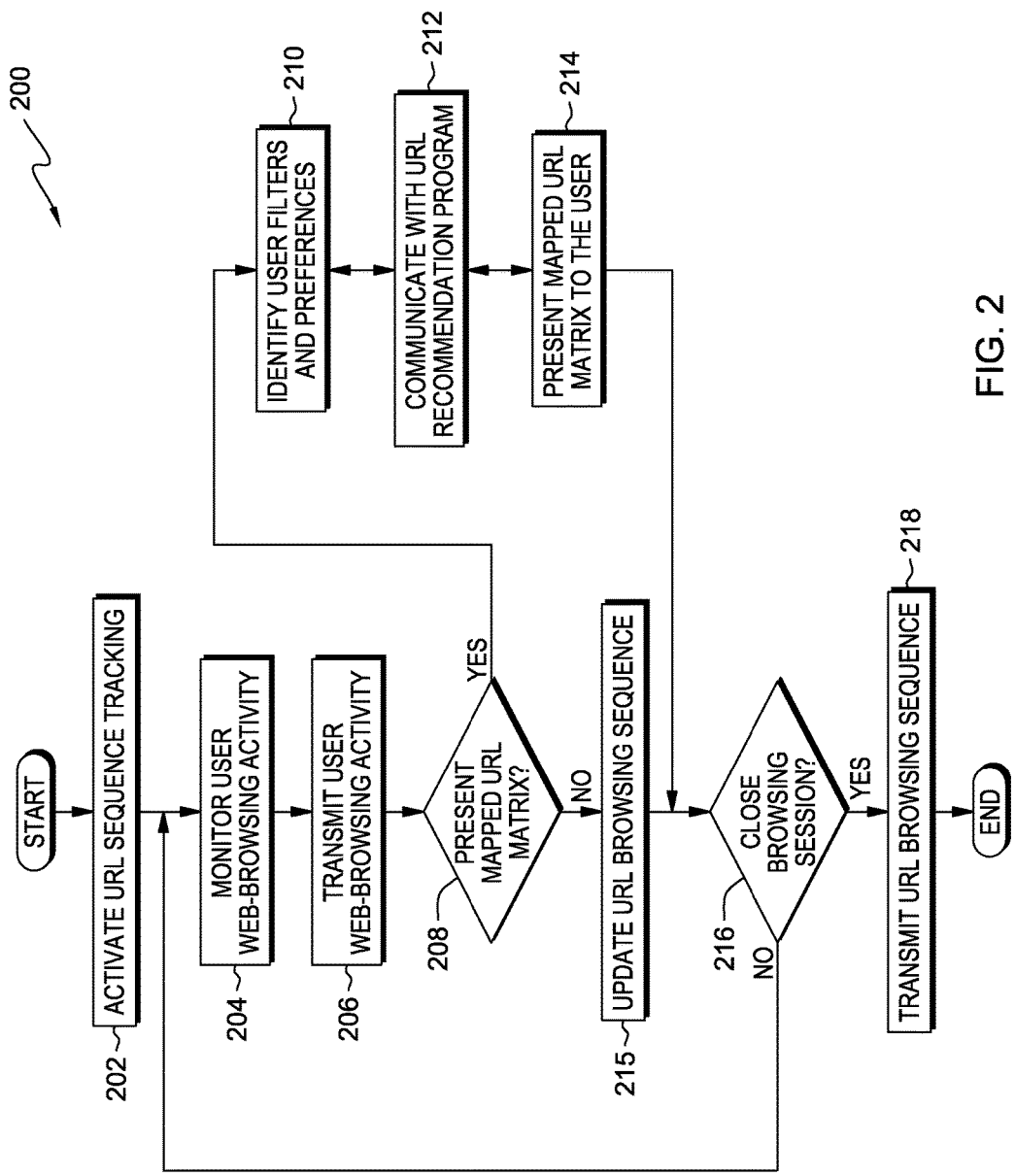
FIG. 2 depicts a flowchart of the steps of a uniform resource locator (URL) mapping application, in accordance with an embodiment of the present invention.

FIG. 2 is a flowchart depicting operational steps for URL mapping app 200 executing on client device 120 within distributed data processing environment 100 of FIG. 1. In one embodiment, URL mapping app 200 collects data related to the Web (i.e., the Internet) browsing activity of a user. In one scenario, URL mapping app 200 passively collects the web-browsing activity of a user. For example, a user may not be interested in obtaining URL recommendations during this web-browsing session. However, the user permits the collection of web-browsing data. In another scenario, a user permits (e.g., provides an indication) the collection of web-browsing data during any web-browsing session. In one instance, a user selects when web-browsing data is collected. In yet another instance, a user sets a preference that automatically prevents the collection of web-browsing data for one or more categories (e.g., tags, information contained in meta-data, etc.). For example, a user may not want web-browsing information for investments or financial institutions tracked (e.g., collected).

In step 202, URL mapping app 200 activates the tracking of the sequence of URLs associated with the web-browsing activity of the user of client device 120. In one embodiment, URL mapping app 200 is manually activated by a user of client device 120. In one scenario, URL mapping app 200 can act as a widget associated with a web-browser application. For example, URL mapping app 200 appears as an icon in a toolbar of a web browser. In another scenario, URL mapping app 200 is a widget that appears in the GUI of client device 120. In another embodiment, URL mapping app 200 is linked to the activation of a web browser. For example, the automatic activation of URL mapping app 200 is controlled by a user preference identified to the web browser. In some embodiments, URL mapping app 200 can be activated or deactivated by the user at any time during a web-browsing session without affecting the operation of the web browser.

In step 204, URL mapping app 200 monitors the web-browsing activity of a user of client device 120. In one embodiment, URL mapping app 200 tracks individual URLs that a user of client device 120 accesses. In one scenario, URL mapping app 200 monitors the activity of a user within a tab. In another scenario, URL mapping app 200 tracks the URL related to other tabs whether the user opened the tab or whether a URL link activated within a previous webpage generates a tab (e.g., creates a pop-up). In another embodiment, URL mapping app 200 does not track cross-domain URLs. For example, URL mapping app 200 tracks a user to an e-commerce URL (e.g., website), but URL mapping app 200 does not track the browsing activity of the subsequent webpages visited by a user during the shopping and purchasing activities of the user within the e-commerce website. In other embodiments, URL mapping app 200 monitors additional web browser windows. In one scenario, a user opens a new web browser window. In one instance, a user manually enters a URL. For example, a user may cut-and-paste the URL from a previous webpage. In this example, URL mapping app 200 may detect the cut-and-paste activity and subsequently analyze the source code of open webpages to determine which webpage originated the cut-and-pasted URL. Subsequently, URL mapping app 200 associates the cut-and-pasted URL with a mapping sequence of the determined webpage.

In another instance, URL mapping app 200 determines that the manually entered URL is not associated with the URLs of open webpages. URL mapping app 200 may consider the manually entered URL as the starting point of a new mapping sequence. In another scenario, a new web-browser window is automatically generated. For example, some pop-up windows activate additional web-browser instances rather than generating a new tab within the current web-browser window. In some embodiments, URL mapping app 200 determines a level of interest associated in a webpage (e.g., URL). In some scenarios, URL mapping app 200 determines the level of interest based on explicit responses. For example, does the user enter a "like" or ranking (e.g., voting rating, one star, five star, etc.) designation for a visited website (e.g., URL).

In other scenarios, URL mapping app 200 determines a level of interest based on implicit data. Examples of implicit data are: time spent browsing a webpage, bookmarking a particular webpage, capturing text from the webpage, printing the webpage, and e-mailing or sharing the webpage URL. URL mapping app 200 can identify interest levels with a binary response. In one example, a user ignores the webpage via minimizing or closing a browser tab or a browser window. Alternatively, URL mapping app 200 can determine interest levels as gradients. For example, the time spent by a user browsing the website. Additionally, URL mapping app 200 obtains and associates other types of information with a webpage. For example, URL mapping app 200 may extract and store information associated with tags, meta-data, visitor counters, required plug-ins, embedded URL links, content items (e.g., picture catalogs, video files, music files, etc.), redirect code, certificates, security (e.g., website reputation rating, trust rating, etc.), and citations by references (e.g., search engines, other websites).

In step 206, URL mapping app 200 transmits the web-browsing activity (e.g., URLs) of a user to URL mapping database 104 to server 102. In one embodiment, URL mapping app 200 transmits the web-browsing activity of a user to URL mapping database 104 on server 102 as the web-browsing activity occurs. In one scenario, URL mapping app 200 delays transmitting the web-browsing activity of a user to URL mapping database 104 until a threshold is reached. For example, URL mapping app 200 may not consider mapped URL sequences of less than four instances (e.g., links, URLs) significant for the purposes of mapping user activity. In another scenario, URL mapping app 200 detects that a user accesses a weather website and remains within the domain of the weather site. URL mapping app 200 identifies the multiple web pages accessed within the domain as a single interaction. In another scenario, URL mapping app 200 determines that an Internet search, by a user, for reference information on a term, did not exceed the minimum link threshold of four URLs; and therefore, the browsing activity is not transmitted to URL mapping database 104 on server 102. In another embodiment, URL mapping app 200 transmits the web-browsing activity of a user to URL recommendation program 300 to be subsequently processed by URL data aggregation and analysis program 106. In some embodiments, URL mapping app 200 transmits the web-browsing activity of a user to URL data aggregation and analysis program 106.

In decision step 208, URL mapping app 200 determines whether to present a user with a mapped matrix of the URL associated with one or more of the websites (e.g., URLs) visited during a web-browsing session by the user. If URL mapping app 200 determines to present the mapped URL matrix to a user (yes branch, decision step 208), then URL mapping app 200 subsequently identifies filters and preferences associated with a user or chosen by the user. In one embodiment, URL mapping app 200 receives an indication from a user to display the mapped URL matrix. In one scenario, the user indicates to URL mapping app 200 that the current URL of a URL browsing sequence is the focal point (e.g., nexus URL) of the mapped URL matrix. In another scenario, URL mapping app 200 determines that a user retrieves, via UI 122, one or more previously stored (e.g., historical) URL browsing sequences.

URL mapping app 200 subsequently receives an indication from the user that the user wants one or more mapped URL matrices presented based on the retrieved one or more previously stored URL browsing sequences. In another embodiment, URL mapping app 200 automatically presents a user with the mapped URL matrix when conditions, predefined by a user, occur. In one scenario, URL mapping app 200 determines that the mapped URL matrix is presented to a user when the user accesses a URL containing links associated with areas of interest to the user. In another scenario, URL mapping app 200 determines that a user is interested in investigating URL recommendations associated with a previously generated and stored mapped URL matrix. For example, a user indicates, via UI 122, that URL mapping app 200 retrieves the previously stored mapped URL matrix. In one instance, the previously stored mapped URL matrix is stored in file storage 124 on client device 120. In another instance, the previously stored mapped URL matrix is on server 102 in URL mapping database 104 or another location accessible via network 110.

In step 210, URL mapping app 200 identifies the filters and preferences that are subsequently used to present the mapped URL matrix to a user. In some embodiments, URL mapping app 200 dynamically generates user selectable filters. URL mapping app 200 generates filters based on information, associated with URLs within a mapped URL matrix, received from URL recommendation program 300 or URL mapping database 104. For example, URL mapping app 200 may provide filters that permit a user to suppress the display of URLs related to e-commerce when reviewing wilderness-based URLs but includes history-based URLs in the top five selection categories. In one embodiment, user filters and preferences are preset. For example, a user may elect that URL mapping app 200 present a mapped URL matrix of other users that have interests similar to the user. In another embodiment, URL mapping app 200 presents a user, via UI 122, input and selection capabilities. In one scenario, URL mapping app 200 presents a user an input line to search for tags or search terms to constrain the criteria used to present the mapped URL matrix. In another scenario, URL mapping app 200 presents the user a dropdown list to select criteria used to present the mapped URL matrix. In one instance, a user ranks the criteria used by URL mapping app 200 to create the presentation of the mapped URL matrix. In another instance, URL mapping app 200 provides the user a set of dropdown menus, configured in a hierarchical format, which URL mapping app 200 subsequently uses to create the presentation of the mapped URL matrix.

In a different embodiment, URL mapping app 200 identifies a user preference that indicates that URL mapping app 200 searches for one or more URL browsing sequences that were previously saved by a user. The user may select a previously saved (e.g., historical) URL browsing sequence to be the basis of generating one or more mapped URL matrices. In one scenario, the URL browsing sequences of a user are stored on client device 120 in file storage 124. In another scenario, the URL browsing sequences of a user are stored on server 102 on URL mapping database 104. In some embodiments, a user may select more than one URL browsing sequences, either current or stored, to be the basis on one or more mapped URL matrices.

In step 212, URL mapping app 200 communicates with URL recommendation program 300, executing on server 102, to apply one or more user filters and one or more user preferences to the generation of one or more mapped URL matrices. Subsequently, URL mapping app 200 receives the one or more mapped URL matrices from URL recommendation program 300. In one embodiment, URL mapping app 200 dynamically generates options and presents, via UI 122, the selection of options to a user to form the basis of the user filters and user preferences. For example, URL mapping app 200 may determine, based on the one or more mapped URL matrices received from URL recommendation program 300, that the maximum number of common URLs is six; therefore, URL mapping app 200 generates an option for common URL filter values of one through six. Other options generated by URL mapping app 200 may include: social networking based filters, number of other user based filters, top ten tags or keyword based filters, etc. In one scenario, the options dynamically generated by URL mapping app 200 are based, at least in part, on the current URL browsing sequence of the user. In another scenario, URL mapping app 200 communicates with URL recommendation program 300, executing on server 102, obtaining a selection of options for a user to form the basis of the user filters and user preferences. In yet another scenario, URL mapping app 200 presents a user, via UI 122, one or more input areas to enter information relating to the filters and preferences that apply to the browsing session and associated one or more mapped URL matrices. In another embodiment, URL mapping app 200 transmits predefined user filters and user preferences to URL recommendation program 300.

In step 214, URL mapping app 200 presents a user with a mapped URL matrix. The mapped URL matrix includes a recommendation of at least one URL based, at least in part, on preferences and filters associated with a user and the web-browsing activity of a user. In some embodiments, two or more URL browsing sequences may define the web-browsing activity of a user. The two or more URL browsing sequences may be any combination of URL browsing sequences stored by a user and URL browsing sequences of active web-browsing sessions of the user. In one embodiment, URL mapping app 200 presents the mapped URL matrix (e.g., recommended URLs) in a text-based form. In one scenario, URL mapping app 200 presents a mapped URL matrix as plain text, such that a URL may be copied to a web browser. Additional text associated with a recommended URL may include a description of the website associated with the recommended URL, a popularity rating, a list of tags, access information (e.g., quantity of users accessing the URL, a rate at which users access the URL, etc.), and a subset of URLs accessible via the mapped URL. In another scenario, a portion of the text of the mapped URL matrix is hyperlinked to access a URL when selected.

In another embodiment, URL mapping app 200 presents a mapped URL matrix in graphical form. In one scenario, URL mapping app 200 configures the graphical presentation of the mapped URL matrix based on one or more user preferences or via an indication from a user. For example, URL mapping app 200 may provide a preview feature to permit a user to determine which graphical presentation method the user prefers to apply to the current mapped URL matrix. In another scenario, URL mapping app 200 determines which plug-in (e.g., browser extension) or graphical presentation software is installed on client device 120. Subsequently, URL mapping app 200 selects a graphical presentation method based on the installed browser plug-in or the installed graphical presentation software. In one instance, the graphical presentation received from URL recommendation program 300 is in a format that is constrained and may not be modified without further interactions with URL recommendation program 300. In another instance, URL mapping app 200 receives a software code based presentation format from URL recommendation program 300 for a mapped URL matrix. The software code based presentation format may be dynamically reconfigured by the user of client device 120 without further interactions with URL recommendation program 300. In addition, in some embodiments, URL mapping app 200 communicates with URL recommendation program 300 in a bidirectional mode allowing a user to select different mapped URL matrices and to modify the presentation of the mapped URL matrix as needed. For example, URL mapping app 200 presents a simple mapped URL matrix based on one common URL (e.g., FIG. 4a) to a user of client device 120. Subsequently, the user of client device 120 modifies one or more filters and user preferences that URL mapping app 200 communicates with URL recommendation program 300 to generate a more complex mapped URL matrix depicted by FIG. 4b.

In some embodiments, URL mapping app 200 permits a user to store one or more mapped URL matrices for subsequent review of URLs or URL sequences not explored during a web-browsing session. In one scenario, URL mapping app 200 stores the one or more mapped URL matrices in file storage 124 on client device 120. In another scenario, URL mapping app 200 stores the one or more mapped URL matrices in URL mapping database 104 on server 102. In yet another scenario, URL mapping app 200 stores the one or more mapped URL matrices in a location (e.g., cloud storage) accessible via network 110.

Referring to decision step 208, if URL mapping app 200 determines not to present a mapped URL matrix (no branch, decision step 208), then URL mapping app 200 updates the URL browsing sequence of a user for the current web-browsing session.

In step 215, URL mapping app 200 updates the browsing sequence of a user with one or more URLs that the user visited. In one embodiment, URL mapping app 200 stores the updated URL browsing sequence in file storage 124 on client device 120. In one scenario, URL mapping app 200 automatically stores the updated URL browsing sequence in file storage 124. In another scenario, URL mapping app 200 receives an indication from a user to save the updated URL browsing sequence. For example, in the future, a user may want to explore URLs that branch from the current URL browsing sequence rather than bookmarking the URLs that contain links that branch off of the main sequence of URLs. In another example, a user may recognize that a visited URL contains dynamic content. If the user does not save the updated URL browsing sequence, then the URL containing the dynamic content may present the user with different URL links on subsequent visits, preventing the user from following the same sequence of URLs. In another embodiment, URL mapping app 200 determines which of the one or more URL browsing sequences to update based on which web-browsing session(s) are active.

In decision step 216, if URL mapping app 200 determines that a web-browsing session did not close (no branch, decision step 216), then URL mapping app 200 loops back to step 204 while a user continues web-browsing activity. In one embodiment, URL mapping app 200 monitors the web-browsing sessions associated with a specific web browser. In one scenario, URL mapping app 200 maintains one or more browsing sequences and identifies which browsing sessions (e.g., tabs, browsing windows, etc.) are associated with a web-browsing sequence or URL link. For example, URL mapping app 200 does not identify a browsing session as closed until each session associated with a given URL browsing sequence terminates. In another scenario, URL mapping app 200 does not identify a browsing session as closed until all instances of a specific web browser terminate. In another embodiment, each instance of URL mapping app 200 is handled separately when determining the status of decision step 216.

Referring to decision step 216, if URL mapping app 200 determines that a web-browsing session closes (yes branch, decision step 216), then URL mapping app 200 transmits a URL browsing sequence of a user.

In step 218, URL mapping app 200 transmits one or more URL browsing sequences of a user. In one embodiment, URL mapping app 200 transmits the web-browsing activity of a user to URL recommendation program 300 to be subsequently processed by URL data aggregation and analysis program 106. In another embodiment, URL mapping app 200 transmits the web-browsing activity of a user to URL data aggregation and analysis program 106. In another embodiment, URL mapping app 200 transmits the web-browsing activity of a user to URL mapping database 104. In some embodiments, URL mapping app 200 initiates a pop-up menu within UI 122 prior to transmitting the URL browsing sequences of a user. In one scenario, URL mapping app 200 queries a user to determine whether the user wants to save one or more URL browsing sequences of the user or one or more mapped URL matrices generated by URL recommendation program 300 based on the current browsing session for subsequent retrieval. In another scenario, URL mapping app 200 determines that a user supplied an indication that the browsing information associated with the current session is not utilized (e.g., the user "opts out") by URL recommendation program 300.

Figure 3:
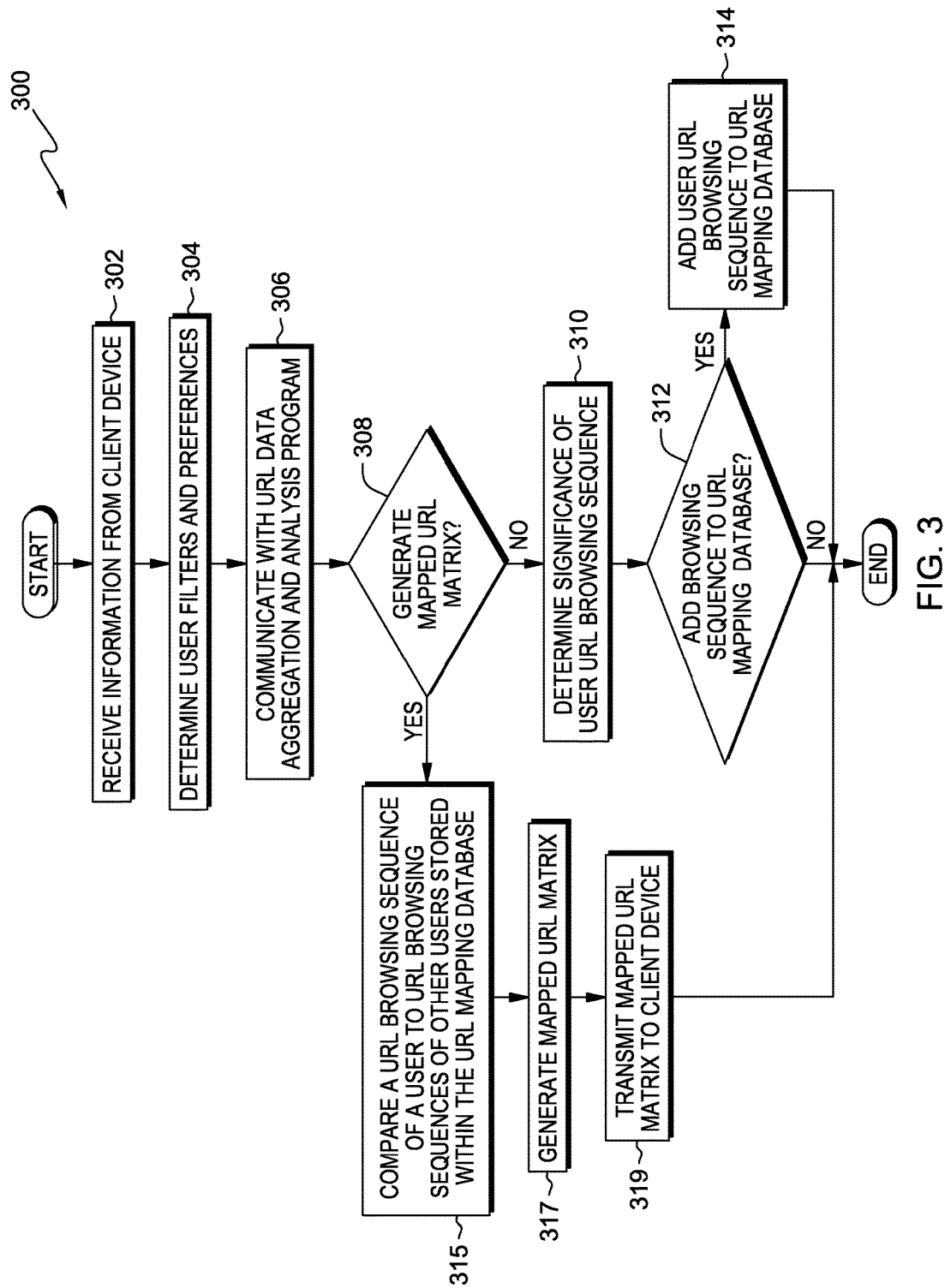
FIG. 3 depicts a flowchart of the steps of a URL recommendation program, in accordance with an embodiment of the present invention.

FIG. 3 is a flowchart depicting operational steps for URL recommendation program 300, executing on server 102 within distributed data processing environment 100 of FIG. 1. URL recommendation program 300 communicates with URL mapping app 200 executing on client device 120 and responds to user activity. URL recommendation program 300 analyzes a sequence of URLs traversed while a user browsed the Web (i.e., Internet). In some embodiments, URL recommendation program 300 anonymizes user web-browsing data. In other embodiments, URL recommendation program 300 obtains URL sequence information that was previously anonymized by another program (e.g., URL data aggregation and analysis program 106) or a proxy service accessed by server 102 via network 110.

In step 302, URL recommendation program 300 receives information from client device 120. In one embodiment, URL recommendation program 300 receives the information associated with web-browsing activities of a user of client device 120. The received information includes at least the related sequence of URLs traversed by the user. Additionally, URL recommendation program 300 may receive implicit information (e.g., data) or explicit information (e.g., data) related to the interest level that a user demonstrated for the URLs comprising the browsing activity of the user. In another embodiment, URL recommendation program 300 receives information associated with filters and preferences indicated by a user. In some embodiments, the information received by URL recommendation program 300 is associated with bidirectional communication with URL mapping app 200. In one scenario, URL recommendation program 300 identifies changes in the selection or presentation of one or more mapped URL matrices. In another scenario, URL recommendation program 300 determines that a user indicates, via UI 122, that a previously stored mapped URL matrix is presented. In yet another scenario, URL recommendation program 300 determines that a user indicates, via UI 122, that URL recommendation program 300 retrieves a previously stored URL browsing sequence and generates one or more mapped URL matrices based on the retrieved URL browsing sequence.

In step 304, URL recommendation program 300 determines which of the one or more filters and which of the one or more preferences that a user indicated for use generate one or more mapped URL matrices. In one example, filters indicated by a user include a minimum popularity threshold, a relevant date range, a URL trust rating, and a subject of interest. In another example, user preferences include one or more common URLs (e.g., nexus URLs), a length for a common URL path, a URL mapping direction (e.g., converging, diverging, bidirectional, etc.), a presentation scheme, a number of URL sequences to display, a dynamic filter display mode (e.g., hierarchical), display suppressed URLs, and a storage location for mapped URL matrices. In another embodiment, URL recommendation program 300 determines that a user preference is associated with the level of anonymity dictated by a user, which is applied to the websites and URL comprising the URL browsing sequence of the user. In one scenario, a single level of anonymity is associated with the URL browsing sequence of a user. In another scenario, URL recommendation program 300 can apply a level of anonymity, including the ability to "opt out," separately to each URL and website within the URL browsing sequence of a user.

In step 306, URL recommendation program 300 communicates with URL data aggregation and analysis program 106. In one embodiment, URL recommendation program 300 transmits a URL browsing sequence of a user and the levels of anonymity dictated by the user that are applied to the URL browsing sequence to URL data aggregation and analysis program 106. In another embodiment, URL recommendation program 300 retrieves one or more URL browsing sequences from URL data aggregation and analysis program 106. In another embodiment, URL recommendation program 300 retrieves one or more URL browsing sequences from URL mapping database 104. In one scenario, the retrieved one or more URL browsing sequences is based on the current web-browsing activity of a user. In another scenario, the retrieved one or more URL browsing sequences were previously stored by a user.

In decision step 308, URL recommendation program 300 determines if a user indicates to generate a mapped URL matrix. In one embodiment, if URL recommendation program 300 determines that a user indicates to generate a mapped URL matrix (yes branch, decision step 308), then URL recommendation program 300 generates one or more mapped URL matrices. In another embodiment, if URL recommendation program 300 determines that URL mapping app 200 indicates that a mapped URL matrix is modified (yes branch, decision step 308), then URL recommendation program 300 generates one or more modified mapped URL matrices. In one scenario, URL recommendation program 300 receives an indication from URL mapping app 200 to generate another mapped URL matrix based on a user selecting another filter or applying a different user preference. In another scenario, URL recommendation program 300 determines that a user retrieves a previously stored mapped URL matrix and indicates that the presentation of the previously stored mapped URL matrix is modified.

In step 315, URL recommendation program 300 compares a URL browsing sequence of a user to the URL browsing sequences of other users stored within URL mapping database 104. In one embodiment, URL recommendation program 300 receives one or more indications (e.g., user filters, user preferences) from a user via URL mapping app 200 executing on client device 120 and a URL browsing sequence (e.g., web-browsing activity) of the user. URL recommendation program 300 queries URL mapping database 104 directly to obtain one or more URL browsing sequences of other users that match the one or more indications of the user and the URL browsing sequence (e.g., web-browsing activity) of the user. In another embodiment, URL recommendation program 300 communicates with URL data aggregation and analysis program 106 to retrieve one or more URL browsing sequences of other users from URL mapping database 104 that match the one or more indications of the user and the URL browsing sequence of the user. URL recommendation program 300 subsequently generates one or more lists of recommended URL sequences traversed by other users.

In step 317, URL recommendation program 300 generates one or more mapped URL matrices. URL recommendation program 300 processes the one or more generated lists of recommended URL sequences traversed by other users and generates various depictions of the one or more lists of recommended URL sequences based on one or more user preferences and one or more user filters. For example, URL recommendation program 300 generates a simple mapped URL matrix based on one common URL (e.g., FIG. 4a). In one embodiment, URL recommendation program 300 generates software code that can dynamically display and update the display of the one or more lists of recommended URL sequences. In one scenario, URL recommendation program 300 employs the capabilities of a web browser on client device 120 to display the one or more lists of recommended URL sequences traversed by other users. In another scenario, URL recommendation program 300 provides the software code that depicts the one or more mapped URL matrices to another presentation application on client device 120. In another embodiment, URL recommendation program 300 generates new presentation schemes for the one or more mapped URL matrices based on indications received from the user via URL mapping app 200.

In some embodiments, URL recommendation program 300 identifies, within portion of the presentation of the one or more mapped URL matrices, that websites or URL links that did not match the preferences of a user or the filters of a user were suppressed. Referring to FIG. 4b, URL recommendation program 300 suppresses four links (URL $CY_3$, URL $ER_3$, $ES_3$, and URL $ET_3$) within the browsing sequence of user 3. In some scenarios, the user may access or display the suppressed links via interacting with the presentation of a mapped URL matrix. In other scenarios, a user modifies one or more user preferences, via UI 122, to display the suppressed links.

In step 319, URL recommendation program 300 transmits a mapped URL matrix to client device 120 via network 110. In one embodiment, URL recommendation program 300 interacts with URL mapping app 200, executing on client device 120, displaying one or more mapped URL matrices. For example, URL recommendation program 300 transmits a mapped URL matrix based on predefined or preselected filters and user preferences. If a user changes a filter setting, URL mapping app 200 transmits the filter setting changes to URL recommendation program 300, and URL recommendation program 300 subsequently generates a new mapped URL matrix and transmits the new mapped URL matrix to client device 120. In another embodiment, URL recommendation program 300 generates a mapped URL matrix that is structured such that the mapped URL matrix is responsive to changes to some user filters and some user preferences. A user inputs the changes to some filters and some user preferences via UI 122 and URL mapping app 200 or the software presenting the mapped URL matrix dynamically alters the presentation of the mapped URL matrix without further interactions with URL recommendation program 300.

Referring to decision step 308, if URL recommendation program 300 does not generate a mapped URL matrix (no branch, decision step 308), then URL recommendation program 300 determines whether the URL browsing sequence of a user is significant.

In step 310, URL recommendation program 300 determines the significance of a URL browsing sequence (e.g., a web-browsing sequence). In one embodiment, URL recommendation program 300 compares the rules associated with URL mapping database 104 and URL data aggregation and analysis program 106 to determine whether a URL browsing sequence received from URL mapping app 200 contains sufficient information to be relevant to other users. In another embodiment, URL recommendation program 300 reviews the requirements of the entity controlling server 102 and URL mapping database 104 to determine whether a URL browsing sequence received from URL mapping app 200 contains sufficient information to be relevant to other users. Rules that may affect a determination of significance include the number of links in a URL browsing sequence, the anonymity level of a user, the profile of a user, the frequency of participation by a user in URL sequence monitoring, and the number of other users "following" a user. For example, URL recommendation program 300 does not consider a URL browsing sequence of less than six links (e.g., URLs) from an anonymous user. In another example, URL recommendation program 300 determines that a URL browsing sequence of at least four links (e.g., URLs) is significant if a user is a power user or the user is "followed" by a threshold number of other users. A URL browsing sequence that URL recommendation program 300 determines to be significant is subsequently added to URL mapping database 104.

In decision step 312, if URL recommendation program 300 determines to add a URL browsing sequence received from URL mapping app 200 (e.g., determined to be significant) to URL mapping database 104 (yes branch, decision step 312), then URL recommendation program 300 adds the URL browsing sequence to URL mapping database 104.

In step 314, URL recommendation program 300 adds one or more URL browsing sequences of a user to URL mapping database 104.

In decision step 312, if URL recommendation program 300 determines not to add a URL browsing sequence received from URL mapping app 200 to URL mapping database 104 (no branch, decision step 312), then URL recommendation program 300 ends.

Figure 4A:
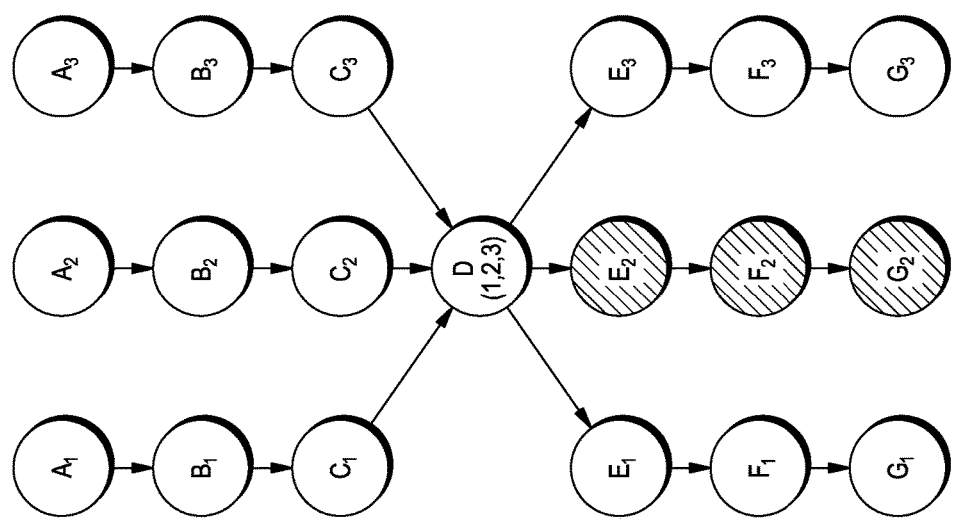
FIG. 4a depicts an example of a common URL based mapping matrix generating strings of URL recommendations, in accordance with an embodiment of the present invention.
Figure 4B:
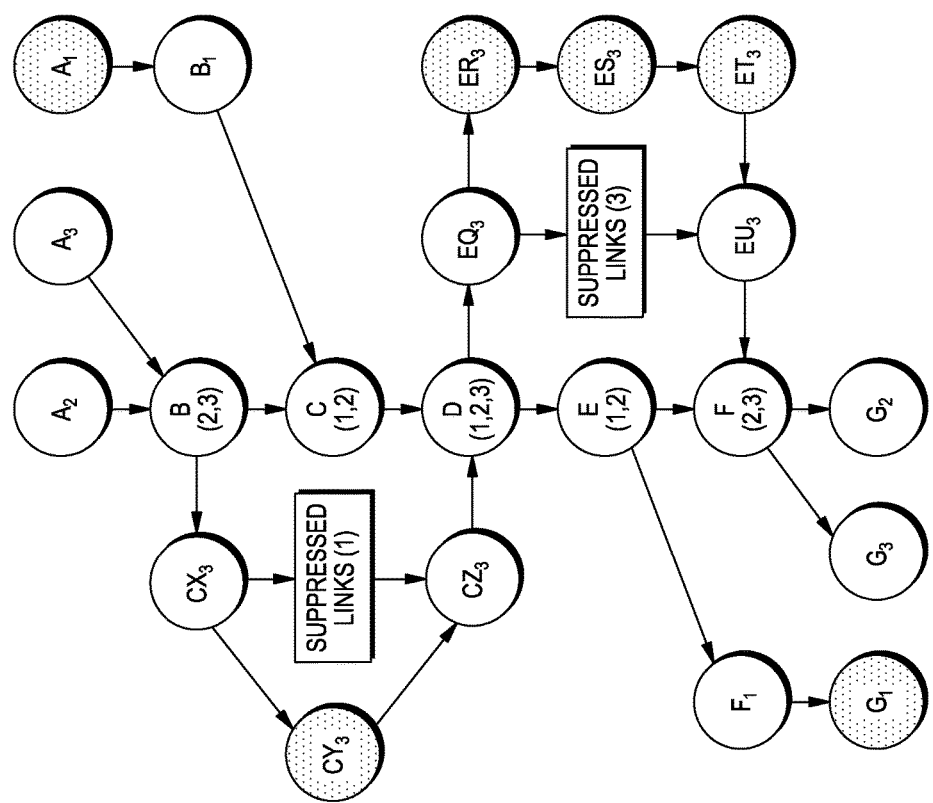
FIG. 4b depicts an example of a mapped URL matrix generating URL recommendations based on a common URL sequence and based on a number of common URLs, in accordance with an embodiment of the present invention.

FIG. 4a is an illustrative example of a mapped URL matrix of three users exhibiting a common URL (e.g., nexus URL). A URL designation with subscript values within parentheses (e.g., URL $D_{(1,2,3)}$) indicates that URL D is a member of the web-browsing sequences of multiple users (e.g., user 1, user 2, and user 3). User 1 accesses common URL $D_{(1,2,3)}$ via a sequence of websites or URLs starting at URL $A_1$ progressing through URL $B_1$ and URL $C_1$. User 2 accesses common URL $D_{(1,2,3)}$ via a sequence of websites or URLs starting at URL $A_2$ progressing through URL $B_2$ and URL $C_2$. User 3 accesses common URL $D_{(1,2,3)}$ via a sequence of websites or URLs starting at URL $A_3$ progressing through URL $B_3$ and URL $C_3$. For example, user 2 initiates (yes branch, decision step 208) the presentation of a mapped URL matrix while accessing common URL $D_{(1,2,3)}$. For example, based on user preferences and filters of a sequence of four URLs (including the common URL), bidirectional mapping, and displaying the history of user 2, URL recommendation program 300 produces FIG. 4a. If user 2 initiates the presentation of the mapped URL matrix prior to visiting ULR $E_2$, URL $F_2$, and URL $G_2$, then URL $E_2$, URL $F_2$, and URL $G_2$ (diagonal hash shading) are not included as the history of user 2 in mapped URL matrix depicted in FIG. 4a. If user 2 initiates the presentation of the mapped URL matrix after visiting ULR $E_2$, URL $F_2$, URL $G_2$, and returning to URL common URL $D_{(1,2,3)}$, then URLs $E_2$, $F_2$, and $G_2$ appear, as part of the history of user 2, in mapped URL matrix depicted in FIG. 4a.

In one embodiment, user 2 sees the sequence of URLs traversed by user 1 (e.g., $A_1$, $B_1$, $C_1$, $E_1$, $F_1$, and $G_1$) and the sequence of URLs traversed by user 3 (e.g., $A_3$, $B_3$, $C_3$, $E_3$, $F_3$, and $G_3$). However, no additional information other than the URL addresses are available for the six websites visited by user 1 and user 3. In another embodiment, URL recommendation program 300 has access to meta-data related to the mapped websites. In one scenario, when the user identifies a URL (e.g., hovers the mouse pointer over the URL) without selecting the URL, a pop-up window appears presenting information related to the identified URL. In another scenario, a user modifies a user preference that enables the display of meta-data information and tags associated with URLs visited by other users. Each URL that has descriptive, viewable meta-data information displays a text box containing the meta-data information.

FIG. 4b is an illustrative example mapped URL matrix based on different URL browsing sequences of three users. User number 2 identified user preferences for generating the URL recommendations based on bidirectional mapping to URLs within one degree of separation (e.g., one link away from a common URL) and that paths comprised of three common URLs are mapped. The URL browsing sequence for user 2 is URL $A_2$, common URL $B_{(2,3)}$, common URL $C_{(1,2)}$, common URL $D_{(1,2,3)}$, common URL $E_{(1,2)}$, common URL $F_{(2,3)}$, and URL $G_2$. For example, user 2 initiates (yes branch, decision step 208) the presentation of a mapped URL matrix after accessing URL $G_2$.

In one embodiment, the URL browsing sequence of user 1 depicts three common URLs that are substantially sequential. User 1 accesses common URL $C_{(1,2)}$ via a sequence of websites or URLs starting at URL $A_1$ and progressing through URL $B_1$. The browsing sequence of user 1 follows the substantially sequential path of common URL $C_{(1,2)}$, common URL $D_{(1,2,3)}$, common URL $E_{(1,2)}$ in common with user 2 and diverges after common URL $E_{(1,2)}$. The URL browsing sequence of user 1 traverses from common URL $E_{(1,2)}$ to URL $F_1$ followed by URL $G_1$. However, URL $A_1$ (stippled shading) and URL $G_1$ (stippled shading) are two degrees of separation away from the path of common URL $C_{(1,2)}$, common URL $D_{(1,2,3)}$, common URL $E_{(1,2)}$; and therefore, URL $A_1$ and URL $G_1$ are not visible to user 2 based on the user preferences set by user 2.

In another embodiment, FIG. 4b depicts a mapped URL matrix and associated URL recommendations based on the URL browsing sequence of user 3 relative to user 2. The URL browsing sequence of user 3 contains three non-sequential URL in common with the URL browsing sequence of user 2. The URL browsing sequence of user 3 contains the common URLs, common URL $B_{(2,3)}$, common URL $D_{(1,2,3)}$, and common URL $F_{(2,3)}$. The recommended URLs within one degree of separation of the mapped URL matrix depicted in FIG. 4b are URL $CX_3$, URL $CZ_3$, URL EQ3, URL $EU_3$, and URL $G_3$. However, URL $CY_3$ (stippled shading), URL $ER_3$ (stippled shading), and URL $ET_3$ (stippled shading) are two degrees of separation away from the common URLs of common URL $B_{(2,3)}$, common URL $D_{(1,2,3)}$, and common URL $F_{(2,3)}$; and therefore, are not visible to user 2. In addition, URL $ES_3$ (stippled shading) is three degrees of separation away from common URL $D_{(1,2,3)}$, and common URL $F_{(2,3)}$; and therefore, URL $ES_3$ is not visible to user 2.

Referring to FIG. 4b, in some embodiments, URL recommendation program 300 inserts placeholders (e.g., Suppressed Links (1), and Suppressed Links (3)) within the mapped URL matrix associated with the browsing sequence of URLs traversed during the browsing sequence of user 3 that satisfy the filters and preferences of user 2. In one scenario, URLs within a browsing sequence of other users where some URLs are further removed (e.g., at a higher degree of separation) from URLs in common with the user (e.g., user 2) are not displayed to the user. However, a placeholder identifying the number of URLs not displayed in a portion of a mapped URL matrix may be incorporated within the mapped URL matrix. In one scenario, URL recommendation program 300 suppresses the display of the URLs that are not displayed. In another scenario, URL recommendation program 300 permits the user, via UI 122, the ability to toggle the display of the URL's associated with a placeholder without the user changing the preference related to degree of separation applied to the URL recommendations identified within a mapped URL matrix. In a different scenario, a user may select a placeholder, depicted within a graphical representation of a mapped URL matrix, indicating that the URLs within the placeholder are displayed. In one example, URL $CY_3$ may be depicted by a placeholder identifying that one link (e.g., URL) within the associated browsing sequence is suppressed. In another example, URL $ER_3$, $ES_3$, and $ET_3$ may be depicted by a placeholder identifying that three links (e.g., URLs) within the associated browsing sequence are suppressed. In another scenario, URL recommendation program 300 generates a mapped URL matrix that incorporates placeholders indicating the number of links (e.g., URLs) of another user (e.g., user 3) that are suppressed (e.g., not displayed) leading (e.g., converging) to the first URL in common with user 2 and leading away (e.g., diverging) from the last URL in common with user 2. For example, placeholders (not shown) may replace URL $A_1$ and URL $G_1$ (stipple shading) that indicate the number of links (e.g., URLs) of another user (e.g., user 3).

Figure 5:
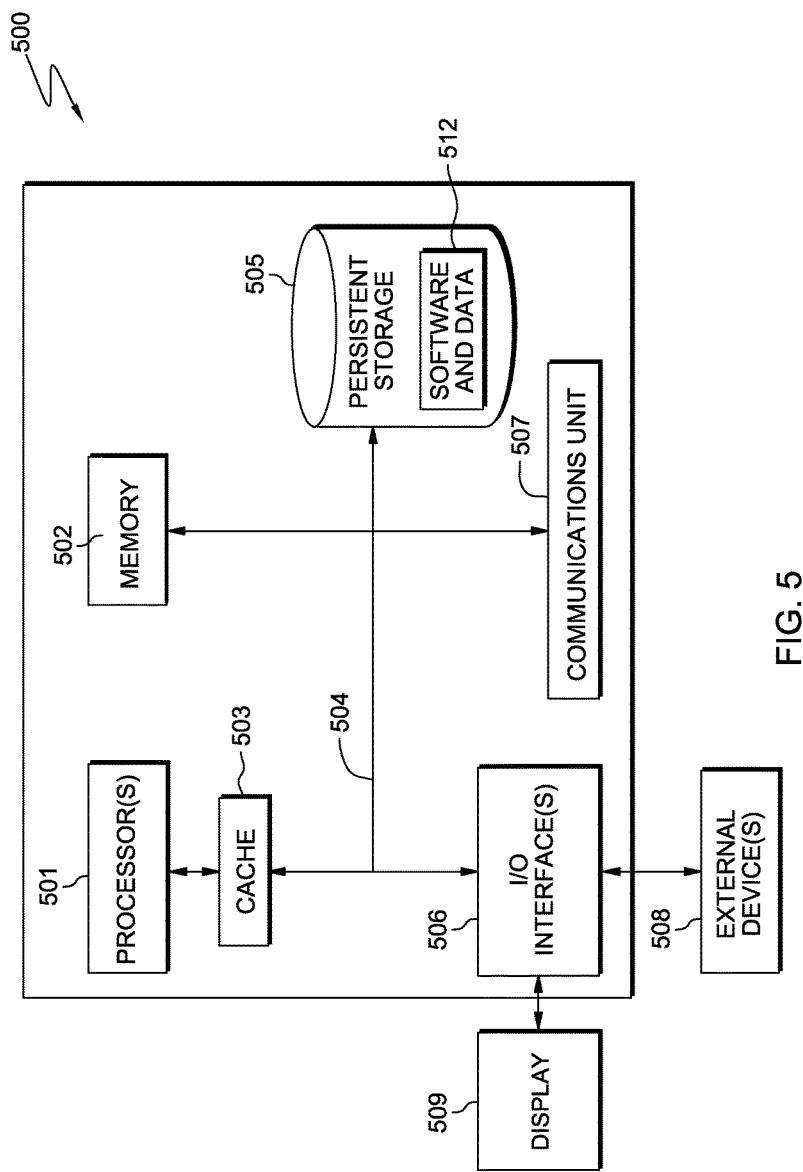
FIG. 5 is a block diagram of components of a computer, in accordance with an embodiment of the present invention.

FIG. 5 depicts computer system 500, which is representative of server 102 and client device 120. Computer system 500 is an example of a system that includes software and data 512. Computer system 500 includes processor(s) 501, cache 503, memory 502, persistent storage 505, communications unit 507, input/output (I/O) interface(s) 506, and communication fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processors 501 via cache 503 and one or more memories of memory 502. With respect to server 102, software and data 512 includes URL mapping database 104, URL data aggregation and analysis program 106, URL recommendation program 300, and other programs and data (not shown). With respect to client device 120, software and data 512 includes user interface (UI) 122, graphical user interface (GUI) not shown, file storage 124, and URL mapping application (app) 200.

Communications unit 507, in these examples, provides for communications with other data processing systems or devices, including resources of server 102 and client device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display device 509.

Display device 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating website recommendations based on user web browsing, the method comprising:

tracking, by one or more computer processors, a sequence of two or more websites traversed by a user, wherein the sequence is based, at least in part, on a web-browsing session of the user;

identifying, by one or more computer processors, a plurality of sequences of websites traversed by other users, wherein the plurality of sequences of websites traversed by other users include at least one website in common with the tracked sequence of two or more websites traversed by the user;

determining, by one or more computer processors, one or more recommended websites in the plurality of sequences of websites traversed by other users that are relevant to the tracked sequence of two or more websites traversed by the user, wherein relevance to the sequence of two or more websites traversed by the user is based on at least one of: a level of interest for one or more websites traversed by the other users, a number of websites that are members of the sequence of two or more websites traversed by the user, a number of substantially sequential websites that are members of the sequence of two or more websites traversed by the user, at least one uniform resource locator (URL) dictated by the user, and one or more user preferences;

associating, by one or more computer processors, a set of information to a website traversed by at least one of the other users, wherein the set of information includes at least one of: tags, meta-data, frequency of bookmarking the website, frequency of sharing the website with another user, a reference citing the website, a duration of browsing the website, a ranking of the website based on user voting, social networking data identifying the website, a popularity rating, a trust rating for the website, and a frequency of access for the website; and determining, by one or more computer processors, a ranking for the website associated with the set of information indicating level of interest for the website traversed by the other users;

modifying, by one or more computer processors, the ranking for the website associated with the set of information based, at least in part, on a degree of anonymity elected by the at least one of the other users; and presenting, by one or more computer processors, the one or more recommended websites to the user.

2. The method of claim 1, further comprising:
modifying, by one or more computer processors, presentation of the one or more recommended websites based, at least in part, on a level of interest respectively associated with the determined one or more recommended websites.

3. The method of claim 1, wherein the tracked sequence of two or more websites traversed by the user is based, at least in part, on a current web-browsing session of the user.

4. The method of claim 1, wherein the tracked sequence of two or more websites traversed by the user is based, at least in part, on stored historical web-browsing information of the user.

5. A computer program product for generating website recommendations based on user web browsing, the computer program product comprising:
one or more computer readable storage media and program instructions stored on the one or more computer readable storage media, the program instructions readable/executable by one or more computer processors and further comprising:
program instructions to track a sequence of two or more websites traversed by a user, wherein the sequence is based, at least in part, on a web-browsing session of the user;
program instructions to identify a plurality of sequences of websites traversed by other users, wherein the plurality of sequences of websites traversed by other users include at least one website in common with the tracked sequence of two or more websites traversed by the user;
program instructions to determine one or more recommended websites in the plurality of sequences of websites traversed by other users that are relevant to the tracked sequence of two or more websites traversed by the user,
wherein relevance to the sequence of two or more websites traversed by the user is based on at least one of: a level of interest for one or more websites traversed by the other users, a number of websites that are members of the sequence of two or more websites traversed by the user, a number of substantially sequential websites that are members of the sequence of two or more websites traversed by the user, at least one uniform resource locator (URL) dictated by the user, and one or more user preferences;
program instructions to associate a set of information to a website traversed by at least one of the other users,
wherein the set of information includes at least one of: tags, meta-data, frequency of bookmarking the website, frequency of sharing the website with another user, a reference citing the website, a duration of browsing the website, a ranking of the website based on user voting, social networking data identifying the website, a popularity rating, a trust rating for the website, and a frequency of access for the website; and program instructions to determine a ranking for the website associated with the set of information indicating level of interest for the website traversed by the other users;

program instructions to modify the ranking for the website associated with the set of information based, at least in part, on a degree of anonymity elected by the at least one of the other users; and program instructions to present the one or more recommended websites to the user.

6. The computer program product of claim 5, further comprising:
program instructions to modify presentation of the one or more recommended websites based, at least in part, on a level of interest respectively associated with the determined one or more recommended websites.

7. The computer program product of claim 5, wherein the tracked sequence of two or more websites traversed by the user is based, at least in part, on a current web-browsing session of the user.

8. The computer program product of claim 5, wherein the tracked sequence of two or more websites traversed by the user is based, at least in part, on stored historical web-browsing information of the user.

9. A computer system for generating website recommendations based on user web browsing, the computer system comprising:
one or more computer processors;
one or more computer readable storage media;
program instructions stored on the computer readable storage media for execution by at least one of the one or more computer processors, the program instructions comprising:
program instructions to program instructions to track a sequence of two or more websites traversed by a user, wherein the sequence is based, at least in part, on a web-browsing session of the user;
program instructions to identify a plurality of sequences of websites traversed by other users, wherein the plurality of sequences of websites traversed by other users include at least one website in common with the tracked sequence of two or more websites traversed by the user;
program instructions to determine one or more recommended websites in the plurality of sequences of websites traversed by other users that are relevant to the tracked sequence of two or more websites traversed by the user,
wherein relevance to the sequence of two or more websites traversed by the user is based on at least one of: a level of interest for one or more websites traversed by the other users, a number of websites that are members of the sequence of two or more websites traversed by the user, a number of substantially sequential websites that are members of the sequence of two or more websites traversed by the user, at least one uniform resource locator (URL) dictated by the user, and one or more user preferences;

program instructions to associate a set of information to a website traversed by at least one of the other users, wherein the set of information includes at least one of: tags, meta-data, frequency of bookmarking the website, frequency of sharing the website with another user, a reference citing the website, a duration of browsing the website, a ranking of the website based on user voting, social networking data identifying the website, a popularity rating, a trust rating for the website, and a frequency of access for the website; and program instructions to determine a ranking for the website associated with the set of information indicating level of interest for the website traversed by the other users program instruction to modify the ranking for the website associated with the set of information based, at least in part, on a degree of anonymity elected by the at least one of the other users; and program instructions to present the one or more recommended websites to the user.

10. The computer system of claim 9, further comprising:

program instructions to modify presentation of the one or more recommended websites based, at least in part, on a level of interest respectively associated with the determined one or more recommended websites.

11. The computer system of claim 9, wherein the tracked sequence of two or more websites traversed by the user is based, at least in part, on a current web-browsing session of the user.

* * * * *